US006904445B1

United States Patent
Bacher

(10) Patent No.: US 6,904,445 B1
(45) Date of Patent: *Jun. 7, 2005

(54) METHOD AND DEVICE FOR CALCULATING A DISCRETE ORTHOGONAL TRANSFORMATION SUCH AS FFT OR IFFT

(75) Inventor: Martin Bacher, Villach (AT)

(73) Assignee: Infineon Technologies AG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/889,539

(22) PCT Filed: Feb. 1, 2000

(86) PCT No.: PCT/DE00/00270

§ 371 (c)(1), (2), (4) Date: Oct. 9, 2001

(87) PCT Pub. No.: WO00/49518

PCT Pub. Date: Aug. 24, 2000

(30) Foreign Application Priority Data

Feb. 18, 1999 (DE) .......................................... 199 06 868

(51) Int. Cl.⁷ ............................................ G06F 17/14
(52) U.S. Cl. ..................................................... 708/400
(58) Field of Search ................................ 708/400, 401, 708/402, 403, 404, 405, 406, 408, 409

(56) References Cited

U.S. PATENT DOCUMENTS

| 5,844,609 | A | * | 12/1998 | Filor et al. ............. 375/240.01 |
| 6,115,728 | A | | 9/2000 | Nakai et al. |
| 6,480,631 | B2 | * | 11/2002 | So et al. ...................... 382/248 |
| 6,505,224 | B1 | * | 1/2003 | Kechriotis .................. 708/410 |

FOREIGN PATENT DOCUMENTS

DE 4442958 6/1996

OTHER PUBLICATIONS

Ma,et al.; *A Hardwood Efficient Control of Memory Addressing for High–Performance FFT Processors;* EEE Transactions on Signal Processing; vol. 48, No. 3, Mar. 2000.

* cited by examiner

*Primary Examiner*—Chuong Dinh Ngo
(74) *Attorney, Agent, or Firm*—Welsh & Katz, Ltd.

(57) ABSTRACT

The invention comprises a method for calculating an orthogonal discrete transform on the basis of the DIT method in prescribed intermediate steps with the following steps: the data are read from a memory organized on page-for-page basis; the intermediate step prescribed by the transform is carried out; the resulting data are stored in a buffer memory; and the resulting data are written page-for-page from the buffer memory to the memory organized on a page-for-page basis. Suitable discrete orthogonal transforms are FFT, IFFT, DCT, IDCT and transforms of similar structure.

16 Claims, 2 Drawing Sheets

METHOD AND DEVICE FOR CALCULATING A DISCRETE ORTHOGONAL TRANSFORMATION SUCH AS FFT OR IFFT

FIELD OF THE INVENTION

The invention relates to a method and a circuit for calculating the fast Fourier transform and also the inverse transform thereof, called FFT and IFFT below, or transforms of similar structure, i.e. discrete orthogonal transforms.

BACKGROUND OF THE INVENTION

The FFT and IFFT are extremely important transforms in communications technology because, by way of example, they transform the description of a factual basis in the time domain into a factual basis in the frequency domain, and vice-versa.

In digital signal processing, an 'N point' discrete Fourier transform, called DFT below, is frequently calculated which is defined as follows:

$$X(k) = \sum_{n=0}^{N-1} x(n) W^{nk} \quad k = 0, 1, \ldots, N-1 \text{ where } W = e^{(-j)2\pi/N}$$

where $W = e^{(-j) 2\pi/N}$

The complexity of calculating the DFT is proportional to $O(N^2)$. By using the FFT, it is possible to reduce the complexity of the calculation to $O(N \log(N))$ This is done by hierarchical splitting of the calculation into transforms having shorter successions.

To calculate the FFT, there are two basic algorithms. One is called "Decimation in Frequency" (DIF) and the other is called "Decimation in Time" (DIT). The text below deals with the DIT algorithm by way of example.

To calculate the FFT, the "in-place" variant is preferably used in which calculated intermediate results of the Butterfly calculation are written to the same memory, from where they are in turn read and put to further use, as shown in FIG. 1. This provides for particularly economical use of the memory.

FIG. 2 shows the calculation operation of the "in-place" variant for N=8 in the form of a signal flowchart. As can be seen from FIG. 2, at the start of the calculation, the memory needs to contain the data in a particular arrangement, usually referred to as "bit-reversed". At the end of calculation, the result can be read linearly. The calculation itself is performed in a plurality of stages, as shown in the signal flowchart in FIG. 2. In the cited example, three stages are necessary. In each case, two data items are read from the memory, the Butterfly is then calculated, and the two results are written back again to the same locations in the memory. In this context, the data items are not necessarily situated in adjacent memory locations, however. In addition, the calculation differs from one stage to the next.

If the FFT is implemented in integrated circuits, the complexity is primarily determined by the memory used. In this context, large memories are usually of page-for-page design, which means that access to a memory cell within such a page is very fast; by way of example, such a memory access operation can be carried out within one clock cycle. Changing from one page to another takes significantly longer, however, i.e. a plurality of clock cycles. It is possible to increase the throughput in page-oriented memories by processing a page of a memory as completely as possible and only then changing the page again, because addresses of the other page are required. In the case of the aforementioned "in-place" FFT, however, the data are, in principle, required in very unorganized form. Small memories do not have this drawback, since access to the individual cells is possible without restriction in this case.

The speed of the FFT is therefore primarily limited by the interface to the memory.

SUMMARY OF THE INVENTION

The invention is therefore based on the object of providing a method and an apparatus for calculating discrete orthogonal transforms, in particular the FFT and IFFT, which permit faster calculation.

The object is achieved by the features of the independent claims. Preferred refinements of the invention are the subject matter of the subclaims.

The first inventive method for calculating an orthogonal discrete transform on the basis of the DIT method in prescribed intermediate steps, where an intermediate step is to be understood as meaning the addition and multiplication of a processing stage, comprises the following steps:
 a) the data are read from a memory organized on a page-for-page basis,
 b) the intermediate step prescribed by the transform is carried out,
 c) the resulting data are stored in a buffer memory, and
 d) the resulting data are written page-for-page from the buffer memory to the memory organized on a page-for-page basis.

The inventive method for calculating an orthogonal discrete transform on the basis of the DIF method in prescribed intermediate steps has the following steps:
 a) the data are read from a memory organized on a page-for-page basis,
 b) the data are stored in a buffer memory,
 c) the intermediate step prescribed by the transform is carried out, and
 d) the resulting data are written page-for-page from the buffer memory to the memory organized on a page-for-page basis.

A third inventive method for calculating an orthogonal discrete transform in prescribed intermediate steps has the following steps:
 a) the data are read from two memories organized on a page-for-page basis, so that the reading is organized on a page-for-page basis,
 b) the intermediate step prescribed by the transform is carried out, and
 c) the resulting data are written page-for-page to the two memories organized on a page-for-page basis.

Examples of a suitable discrete orthogonal transform are an FFT, an IFFT, a DCT or an IDCT and also transforms organized on a schematically similar basis.

Preferably, the transform has an identical geometry for each stage, which facilitates the addressing of the results. By way of example, this condition is satisfied for an FFT or an IFFT based on Singleton.

In accordance with the above methods, the inventive apparatuses have a memory organized on a page-for-page basis, a processor and a directly organized memory which is arranged downstream of the processor, or a memory organized on a page-for-page basis, a processor and a directly organized buffer memory which is arranged upstream of the processor, or two memories organized on a page-for-page basis and a processor.

In this context, the processor provides a "Butterfly".

CONCISE DESCRIPTION OF THE DRAWINGS

Preferred embodiments of the invention are explained below with reference to the drawings.

DETAILED DESCRIPTION OF SEVERAL EMBODIMENTS OF THE INVENTION

Figure 1:
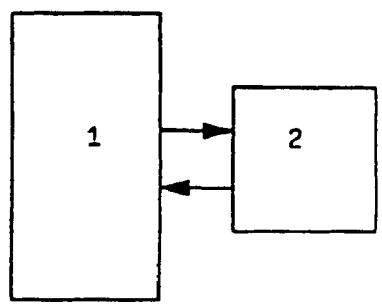
FIG. 1 shows the diagram for calculation of an "in place" FFT.

FIG. 1 shows the aforementioned usual "in-place" calculation of an FFT, where a data pair is read from a memory 1, normally a DRAM, is logically combined in a Butterfly unit 2 and is written to the memory 1 again.

Figure 2:
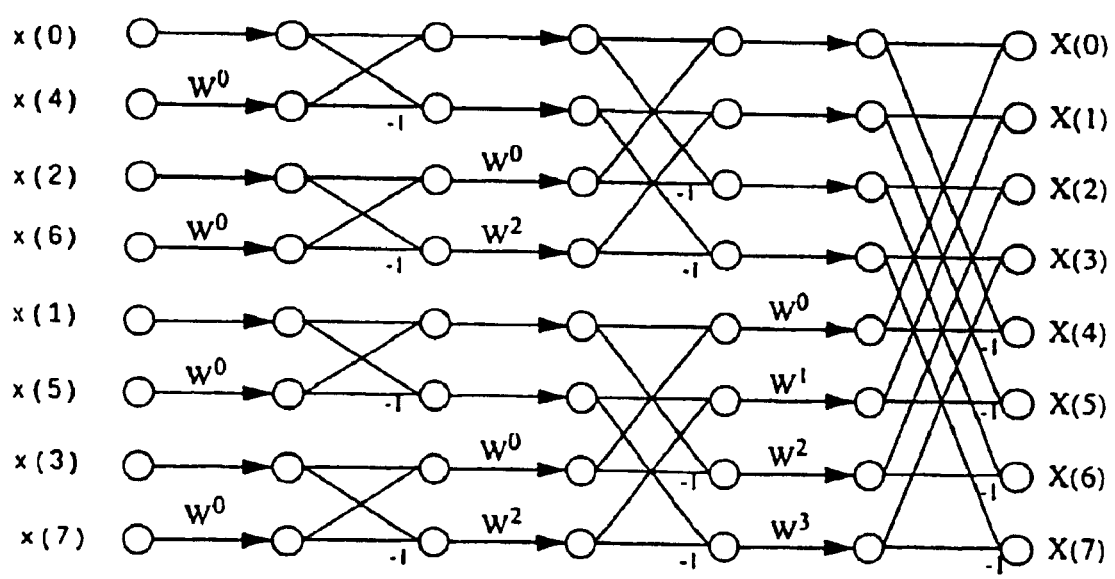
FIG. 2 shows the signal flowchart for an "in place" FFT for N=8.

FIG. 2 shows the basic DIT algorithm for an FFT calculation for N=8. For calculation, the data items x(0) to x(7) need to be present in the memory in "bit-reversed" fashion at the start. The figure shows the signal flowchart for calculating the Fourier components X(0)–X(7). The algorithm and the signal flowchart are described in A. V. Oppenheim, R. W. Schafer: "Digital Signal Processing", Prentice-Hall Inc., Englewood Cliffs, N.J., USA, 1975, pp. 285 ff., so that there is no need for this to be explained in more detail here. With regard to the nomenclature, the factors $W^0$, $W^1$ and $W^2$ are also called twiddle factors.

Figure 3:
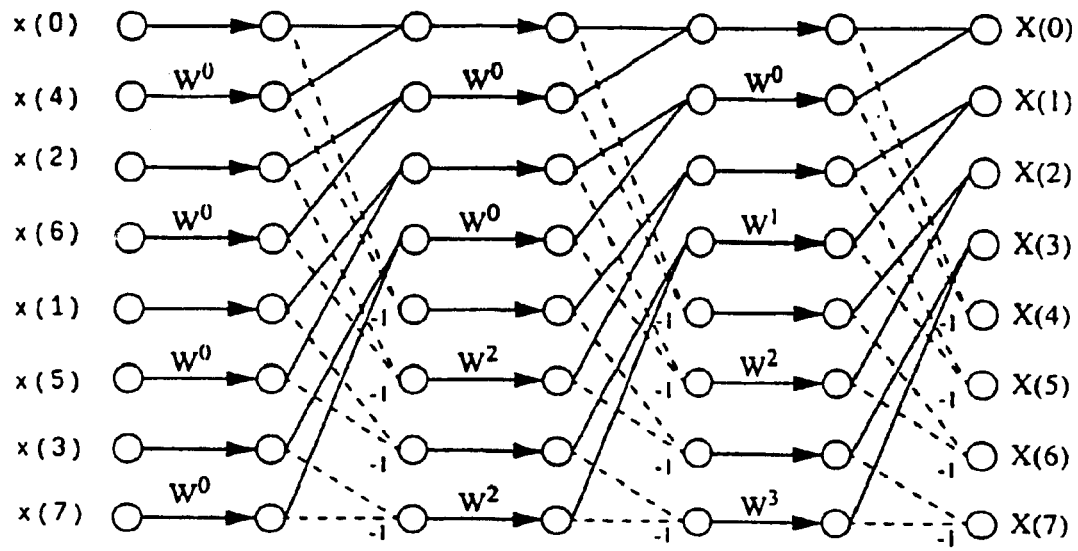
FIG. 3 shows the signal flowchart for a "Singleton" FFT for N=8.

FIG. 3 shows an FFT algorithm with an altered sequence of computation operations, the "Singleton algorithm", which is described on page 301 of the aforementioned literature reference Oppenheim-Schafer and is used in the method according to the invention. It is clear to see that the data are processed in very regular fashion, but no "in place" processing is carried out. Twice the memory space as compared with the "in place" calculation is therefore required.

Advantageously, the calculation has entirely the same structure in each stage, with the exception of the twiddle factors. This means that the stages of the illustrative algorithm for an FFT for N=8 have an identical geometry. When a stage has been processed, the last memory written to is read and another memory is written to.

The memory can be read linearly. Linear writing is not yet possible in the algorithm, however, since it is always necessary to store one result in the top half (solid line) and one result in the bottom half (dashed line). However, linear writing is possible in the top and bottom halves.

Figure 4:
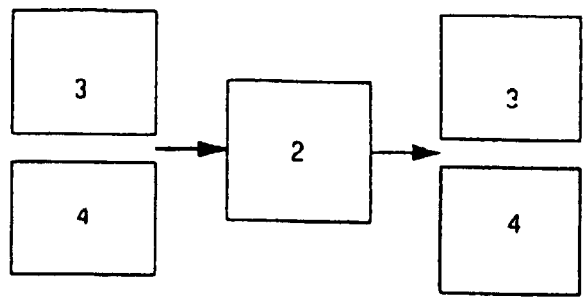
FIG. 4 shows a first embodiment for calculating an FFT.

FIG. 4 shows a schematic illustration of a first inventive embodiment for rapidly calculating an algorithm which has a similar or the same design as the Singleton algorithm shown in FIG. 3. [lacuna] Such an apparatus, which is suitable both for DIF and DIT calculation, the memory required for the calculation is subdivided into two page-oriented memories 3, 4 which are of the same size and are in the form of DRAMs (DRAM=Dynamic RAM). The use of two page-oriented memories 1 and 2 means that each memory can inherently be written to in linear fashion, i.e. a respective memory is used for the top and bottom halves of the algorithm shown in FIG. 3, so that the number of slow page changes is small. The number of memories and the number of interfaces are doubled, however.

Figure 5:
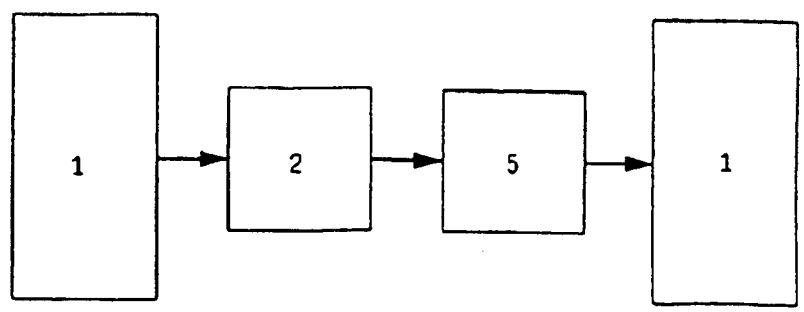
FIG. 5 shows a second embodiment for calculating an FFT on the basis of the DIT method.

A second embodiment, shown in FIG. 5, for rapidly calculating a DIT transform like that in FIG. 3 is the use of a small fast memory 5 arranged downstream of the Butterfly 2. This memory buffer-stores a few intermediate results of the calculation so that it can then write them to the page-oriented memory 1 without constantly changing page. The course of the calculation is now that two data items are read from the memory 1, are supplied to the Butterfly, and the intermediate results are stored in the fast SRAM memory 5 (SRAM=Static RAM). The intermediate results are then written page-for-page to the page-oriented memory 1.

In the case of calculation on the basis of the DIF method, the static fast memory 5 is situated at the input of the Butterfly 2 (not shown). In other respects, the manner of operation is similar to that of the DIT variant explained.

The table 1 below illustrates the addressing scheme for calculation using buffer-storage:

TABLE 1

| DRAM (RD) | Butterfly | SRAM (WR) | SRAM (RD) | DRAM (WR) |
|---|---|---|---|---|
| 0 | 0 | 0 | | |
| 1 | 16 | 8 | | |
| 2 | 1 | 1 | | |
| 3 | 17 | 9 | | |
| 4 | 2 | 2 | 0 | 0 |
| 5 | 18 | 10 | 1 | 1 |
| 6 | 3 | 3 | 2 | 2 |
| 7 | 19 | 11 | 3 | 3 |
| 8 | 4 | 4 | 8 | 16 |
| 9 | 20 | 12 | 9 | 17 |
| 10 | 5 | 5 | 10 | 18 |
| 11 | 21 | 13 | 11 | 19 |
| 12 | 6 | 6 | 4 | 4 |
| 13 | 22 | 14 | 5 | 5 |
| 14 | 7 | 7 | 6 | 6 |
| 15 | 23 | 15 | 7 | 7 |
| 16 | 8 | 0 | 12 | 20 |
| 17 | 24 | 8 | 13 | 21 |
| 18 | 9 | 1 | 14 | 22 |
| 19 | 25 | 9 | 15 | 23 |
| 20 | 10 | 2 | 0 | 8 |
| 21 | 26 | 10 | 1 | 9 |
| 22 | 11 | 3 | 2 | 10 |
| 23 | 27 | 11 | 3 | 11 |
| 24 | 12 | 4 | 8 | 24 |
| 25 | 28 | 12 | 9 | 25 |
| 26 | 13 | 5 | 10 | 26 |
| 27 | 29 | 13 | 11 | 27 |
| 28 | 14 | 6 | 4 | 12 |
| 29 | 30 | 14 | 5 | 13 |
| 30 | 15 | 7 | 6 | 14 |
| 31 | 31 | 15 | 7 | 15 |
| | | | 12 | 28 |
| | | | 13 | 29 |
| | | | 14 | 30 |
| | | | 15 | 31 |

In the example, the page-oriented memory has a depth of N=32, which means that an FFT having 32 points can be calculated. A page of the slow page-oriented memory may have P=4 addresses, for example, and the fast memory used may have a size of S=4·P=16 addresses. The data can be read linearly in the order 0, 1, 2, . . . By way of example, for the purposes of processing, the Butterfly reads (RD) the data for the DRAM addresses 0 and 1. The intermediate results of the Butterfly produce addresses 0 and 16. These are written (WR) to the addresses 0 and 8 of the fast buffer memory SRAM. With a delay which is required for partly filling the memory, the data are read page-for-page in linear fashion, that is to say, in table 1, under SRAM (RD) the addresses 0–3, then 8–11 etc. The content of these SRAM addresses is written page-for-page in linear fashion to the appropriate addresses, which are conditional on the transform, of the slow page-oriented memory (column DRAM (WR)), that is to say on the basis of 0–3, 16–19, 4–7 etc., in the example. The use of the small fast memory therefore optimizes access to the page-oriented memory DRAM such that the slow page changes required are as few as possible.

The transforms and memory sizes mentioned above and explained serve only as an illustration. In practice, the slow memory is much larger than the fast memory. By way of example, the slow memory is normally designed for N=8192, with the slow memory having a page size of P=16. The small memory therefore has a size of 64 addresses. In an integrated implementation, the fast small memory is therefore of barely any consequence in terms of surface area, but calculation of the FFT or IFFT or of similar discrete orthogonal transforms is significantly speeded up on account of the minimization of the page changes in the slow memory.

LIST OF REFERENCE NUMERALS

1 Page-oriented memory
2 Butterfly
3 Page-oriented memory
4 Page-oriented memory
5 Fast memory

What is claimed is:

1. A method for calculating an orthogonal discrete transform on the basis of the DIT method in prescribed intermediate steps,
   wherein
   a) the data are read from a memory organized on a page-for-page basis,
   b) the intermediate step prescribed by the transform is carried out,
   c) the resulting data are stored in a buffer memory, and
   d) the resulting data are written page-for-page from the buffer memory to the memory organized on a page-for-page basis.

2. The method as claimed in claim 1, wherein the discrete orthogonal transform is formed by an FFT, IFFT, DCT or IDCT.

3. The method as claimed in claim 2, wherein the transform has an identical geometry for each stage.

4. The method as claimed in claim 3, wherein an FFT or IFFT based on Singleton is used.

5. An apparatus for carrying out the method as claimed in claim 1
   wherein
   the apparatus has a memory organized on a page-for-page basis, a processor and a directly organized memory which is arranged downstream of the processor.

6. The apparatus as claimed in claim 5, wherein the page-oriented memory is a large memory in relation to the directly organized buffer memory.

7. The apparatus as claimed in claim 6, wherein a fast memory is used for the buffer memory.

8. The apparatus as claimed in claim 5, wherein the page-oriented memory is a dram and buffer memory is an SRAM.

9. The apparatus as claimed in claim 5, wherein the page-oriented memory has a size of 8 K addresses and the buffer memory has a size of 32–64 addresses.

10. The apparatus as claimed in claim 5, wherein the processor provides a Butterfly.

11. An apparatus for carrying out the method as claimed in claim 1
    wherein
    the apparatus has a memory organized on a page-for-page basis, a processor and a directly, organized memory which is arranged upstream of the processor.

12. A method for calculating an orthogonal discrete transform on the basis of the DIF method in prescribed intermediate steps,
    wherein
    a) the data are read from a memory organized on a page-for-page basis,
    b) the data are stored in a buffer memory,
    c) the intermediate step prescribed by the transform is carried out, and
    d) the resulting data are written page-for-page from the buffer memory to the memory organized on a page-for-page basis.

13. A method for calculating an orthogonal discrete transform on the basis of the DIF method in prescribed intermediate steps,
    wherein
    the data are read from two memories organized on a page-for-page basis, such that the reading is organized on a page-for-page basis, the intermediate step prescribed by the transform is carried out, and
    the resulting data are again written page-for-page to the two memories organized on a page-for-page basis.

14. An apparatus for carrying out the method as claimed in claim 13
    wherein
    the apparatus has two memories organized on a page-for-page basis and a processor.

15. The apparatus as claimed in claim 14, wherein the page-oriented memories are of the same size.

16. The apparatus as claim in claim 15, wherein the page-oriented memory has a size of 4 K addresses.

* * * * *